United States Patent [19]
Fletcher et al.

[11] 4,085,332
[45] Apr. 18, 1978

[54] APPARATUS FOR EXTRACTION AND SEPARATION OF A PREFERENTIALLY PHOTO-DISSOCIATED MOLECULAR ISOTOPE INTO POSITIVE AND NEGATIVE IONS BY MEANS OF AN ELECTRIC FIELD

[76] Inventors: James C. Fletcher, Administrator of the National Aeronautics and Space Administration, with respect to an invention of Horst E. Wilhelm, Fort Collins, Colo.

[21] Appl. No.: 692,413

[22] Filed: Jun. 3, 1976

[51] Int. Cl.² .......................... B01K 1/00; B01D 59/00
[52] U.S. Cl. ........................................... 250/528; 55/2; 55/100; 55/101; 250/531; 250/423 P
[58] Field of Search .................... 423/19; 204/157.1 R, 204/DIG. 11; 250/288, 284, 424, 423 P, 527, 528, 531; 55/2, 100, 101

[56] References Cited
U.S. PATENT DOCUMENTS

| | | | |
|---|---|---|---|
| 3,443,087 | 5/1969 | Robieux et al. | 250/290 |
| 3,624,389 | 11/1971 | Cohen et al. | 250/288 |
| 3,772,519 | 11/1973 | Levy et al. | 250/284 |
| 3,937,956 | 2/1976 | Lyon | 204/157.1 R |
| 3,941,670 | 3/1976 | Pratt, Jr. | 204/DIG. 11 |

OTHER PUBLICATIONS

Robinson et al, "Some Developments in Laser Isotope Separator Research at Los Alamos," Report LA-UR-76-19, USERDA (Feb. 2-5, 1976).
"Physics Today", pp. 18–20, July 1975.
Moore, "Accounts of Chemical Research", 6, 323-328 (1973).
"Nuclear Engineering International", 19, p. 68 (1974).
Gross, "Optical Engineering", vol. 13, No. 6, pp. 506-515 (1974).
"Chemical & Engineering News", p. 20 (July, 1976).

*Primary Examiner*—Edward A. Miller
*Attorney, Agent, or Firm*—N. T. Musial; J. R. Manning; G. E. Shook

[57] ABSTRACT

Apparatus for the separation and extraction of molecular isotopes. Molecules of one and the same isotope are preferentially photo-dissociated by a laser and an ultraviolet source, or by multi-photon absorption of laser radiation. The resultant ions are confined with a magnetic field, moved in opposite directions by an electric field, extracted from the photo-dissociation region by means of screening and accelerating grids, and collected in ducts.

4 Claims, 1 Drawing Figure

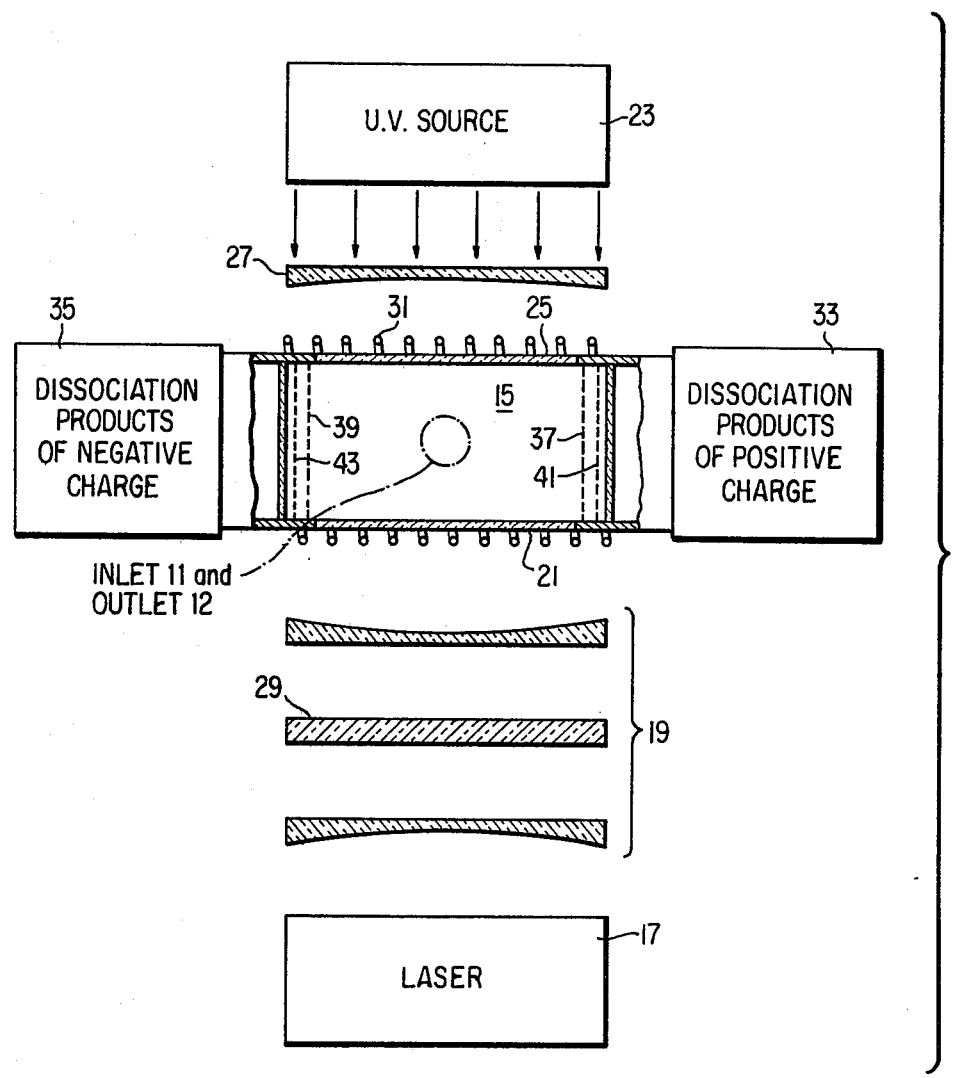

APPARATUS FOR EXTRACTION AND SEPARATION OF A PREFERENTIALLY PHOTO-DISSOCIATED MOLECULAR ISOTOPE INTO POSITIVE AND NEGATIVE IONS BY MEANS OF AN ELECTRIC FIELD

ORIGIN OF THE INVENTION

The invention described herein was made in the performance of work under a NASA contract and as subject to the provisions of Section 305 of the National Aeronautics and Space Act of 1958, Public Law 85-568 (72 USC .435; 42 USC 2457).

BACKGROUND OF THE INVENTION

1. Field of the Invention

The present invention relates generally to an isotopic separation and extraction process for uranium in particular but not exclusively.

2. Description of the Prior Art

An essential step in the processing cycle of uranium fuel is the enrichment of the $U^{235}$ isotope content of the natural $UF_6$ from a concentration of 0.7% $U^{235}$ to a concentration of 2 to 4% $U^{235}$ for the "conventional" light-water power reactor fuels, or to a concentration of about 90% $U^{235}$ for the high-temperature gas cooled type power reactor. The enrichment step is not only important but it accounts for about ⅓ of the total fuel-cycle cost. Experiments in the Soviet Union and US have demonstrated that efficient isotope separation is possible using a laser method based on the selective 2-step photo-dissociation of molecules by the simultaneous application of infra-red and ultra-violet radiation (JETP letters 17, 63 (1973)) or multi-photon absorption from a laser source (Appl. Phys. Letters 27, 87 (1975)). Similar methods could be used for the selective photo-dissociation of $UF_6$ isotopes, $UF_6 \rightarrow UF_5^+ + F^-$. A laser isotope separation technique has also been disclosed in U.S. Pat. No. 3,443,087 isused to J. Robieux et al.

The selective two-step photo-dissociation takes place by first exciting one of the isotopic molecules from the vibrational ground state to an excited state, both molecules initially being in the electronic ground state. This vibrational-rotational transition is in the infrared region and is produced by a pulse from a laser tuned to this frequency. Immediately following this infrared pulse, an ultra-violet pulse excites the selected molecules to an unbound level in the electronic excited state and the combined two pulses produce the selective photo-dissociation. Another method of preferentially dissociating a molecular isotope species is by multiple photon absorption, which transports the molecule up the vibrational manifold to dissociation. Multiple photon absorption occurs through either of the following processes: (1) Sequential absorption of $n$ photons by the molecule where the molecule passes through real intermediate quantum states (until dissociation occurs); (2) simultaneous absorption of $n$ photons by the molecule where the molecule passes through virtual intermediate quantum states (until dissociation occurs). The number $n > 1$ is determined by the dissociation energy of the selected molecular isotope and the laser frequency. In these multiple photon processes, the isotopic selectivity is established by the much higher transition probability in the first few intermediate steps for laser frequencies tuned to match one isotopic species. The latter method eliminates the need for a high power ultraviolet radiation source, and is more efficient since the multiphoton absorption cross section is in general much larger than the single photon absorption cross section in the ultraviolet region.

A problem as important as isotope separation is that of effective extraction of the selected isotope ions from the molecular isotope mixture. The Robieux et al. patent teaches that the produced molecular ions may be separated somehow from the neutral molecules by use of the electric or magnetic fields. However, there is no specific disclosure of how to maximize the efficiency of the extraction process so as to permit the achievement of continuous and efficient collection of isotopes.

SUMMARY OF THE INVENTION

It is therefore one object of the present invention to provide an improvement in the process of separation and in particular extraction of isotopes.

It is another object of the present invention to provide such an improvement which is practical in operation.

It is yet another object of the present invention to provide such an improvement which will cheaply and efficiently selectively produce molecular isotopes and other isotopes.

The objects of the present invention are achieved by a method for separating and extracting isotopes of a gaseous mixture containing a first isotope having a first excitation energy level and a second isotope having an excitation energy level different from the first excitation energy level. The method comprises subjecting the gaseous mixture to radiation emitted by a first radiation source at a predetermined frequency that excites the molecules of the first isotope but not the molecules of the second isotope, subjecting the gaseous mixture to radiation emitted by a second radiation source at a predetermined frequency which dissociates the excited molecules of the first isotope but not the nonexcited molecules of the second isotope. Another method of photodissociation is to subject the molecular isotope mixture to a laser beam of high power density ($P > 10^8$ Watts/cm²) so that the isotope molecule to be separated absorbs subsequently or simultaneously the number of laser photons required for its dissociation into fragments of positive and negative charge. The laser frequency lies in such a narrow band that the first isotope molecule species absorbs preferentially while the second isotope molecule species does not significantly absorb. The method further comprises the steps of confining the charged dissociation products in the mixture with a magnetic field and exposing the gaseous mixture to an electric field which selectively moves the charged dissociation products in the mixture in reverse directions, accelerating the dissociation products of positive charge in the mixture through a first extraction grid system characterized by a first potential difference, accelerating the dissociation products of negative charge in the mixture through a second extraction grid system characterized by a second potential difference, collecting the dissociation products of positive charge in the first duct, and collecting the dissociation products of negative charge in the second duct.

The foregoing as well as other objects, features and advantages of the present invention will become more apparent from the following detailed description taken in conjunction with the appending drawing.

BRIEF DESCRIPTION OF THE DRAWING

The FIGURE is a schematic diagram of a photochemical reactor incorporating two ion extractors which are utilized in performing the process of the present invention.

DESCRIPTION OF THE PREFERRED EMBODIMENT

Referring to the FIGURE there is illustrated a photochemical reactor for carrying out the method steps of photo-dissociating one species of isotopic molecules into positive and negative ions. A gaseous stream of isotopic polar compounds, for instance hydrogen chloride, $HCl^{35}$ and $HCl^{37}$, flows between the inlet 11 and the outlet 12 of a vacuum chamber 15 having longitudinal symmetry. Narrow band laser radiation originating from a first radiation source 17 is directed through a focusing device 19 into the chamber 15 through a window 21. Ultra-violet radiation from a second radiation source 23 is let subsequently into the chamber 15 through a window 25 and a focusing device 27. The ultra-violet radiation is prevented from reaching the laser source 17 by a filter 29. The laser source is tuned to the desired predetermined frequency for exciting the molecule of only one of the two compounds both of which initially are in the electronic ground state. The laser radiation excites the molecules of the first compound from a vibrational ground state to an excited state, the band of the radiation being sufficiently narrow as not to excite molecules of the second compound which has an excitation energy level different from that of the first compound. The ultra-violet source 23 provides radiation at a predetermined frequency to cause the excited molecules to reach an unbound level in the electronic excited state and become dissociated ($HCl \rightarrow H^+ + Cl^-$), while the non-excited molecules still in the ground state, will not reach the unbound level and will not become dissociated. On the other hand, if the multiple photon dissociation mode is used, narrow band laser radiation originating from a high power ($P > 10^8$ Watts/cm$^2$) laser source 17 is directed through a focusing device 19 into the chamber 15 through a window 21. Selective dissociation of only one of the isotopic polar compounds into positive and negative ions ($HCl \rightarrow H^+ + Cl^-$) is accomplished by employing a laser frequency tuned to match the first molecular levels of the compound which is to be separated. In both photo-dissociation methods, the chamber pressure of the molecular isotope mixture is chosen to ensure an optimum dissociation rate and a minimum recombination rate of the positive and negative ions. The electric field applied to the chamber is chosen sufficiently weak to avoid electrical breakdown at the respective chamber pressure.

Two ion extractors are incorporated with the photochemical reactor for carrying out the method steps of extracting the isotopic ions and will now be described. The ions produced are confined to the inner region of the vacuum chamber 15 by a longitudinal magnetic field in order to prevent recombination of ions of opposite charge at the walls. A longitudinal magnetic field can be provided, e.g., by a coil 31 whose windings are coaxial with the longitudinal axis of the vacuum chamber. Two electrode systems are maintained at opposite ends of the chamber to separate ions of opposite charge and collect them in the ducts 33 and 35. A first screening grid 37 is disposed along the longitudinal axis at one end of the chamber 15 and has applied thereto a potential $V_3$. A second screening grid 39 is disposed along the longitudinal axis at the other end of the chamber and has applied thereto a potential $V_2$ greater than $V_3$. The gaseous mixture is thereby exposed to a longitudinal electric field created by the difference in potential $V_3 - V_2$ which selectively moves the ions of opposite charge in reverse directions. A first accelerating grid 41 is disposed along the longitudinal axis of the chamber behind the first screening grid 37 and has applied thereto a potential $V_4$ less than $V_3$. The difference in potential in the region between the first accelerating grid 41 and the first screening grid 37, $V_4 - V_3$, accelerates the molecular dissociation products of positive charge in a beam, the direction of which is along the longitudinal axis of the chamber, and the positive ion beam thus produced is collected in the right duct 33. A second accelerating grid 43 is disposed along the longitudinal axis of the chamber, behind the second screening grid 39 and has applied thereto a potential $V_1$ greater than $V_2$. The difference of potential between the accelerating grid and the screening grid, $V_1 - V_2$, accelerates the molecular dissociation product of negative charge in a beam, the direction of which is along the longitudinal axis of the chamber and the ion beam thus produced is collected in the left duct 35. Since the ions are to be extracted at equal rates, and since the ions of unlike charge will have different masses, the differences of potential in the region between the screen grid and accelerating grid of the respective sets of electrods are chosen so that the molecular dissociation products of opposite charge and different mass emerge at optimum rates at the ducts.

Obviously, numerous additional modifications and variations of the present invention are possible in the light of the above teachings. For example, a useful modification would be to neutralize the charged particle beams in the ducts to prevent beam spreading and wall losses. The positive ion beam is readily neutralized by injecting electrons from a neutralizer discharge, as disclosed in U.S. Pat. No. 3,156,090. The electrons attached to the particles of the negative beam could be removed, e.g., by charge exchange in presence of a more electronegative gas in the left duct.

What is claimed as new and desired to be secured by letters patent of the United States is:

1. Apparatus for separating and extracting isotopes of a gaseous mixture containing a first isotope species having a first excitation energy level and a second isotope species having an excitation energy level different from the first excitation level comprising:
   a first radiation source for subjecting the gaseous mixture to radiation at a predetermined frequency that excites the molecules of the first isotope and not the molecules of the second isotope;
   a second radiation source for subjecting the gaseous mixture to radiation at a predetermined frequency which dissociates the excited molecules of the first isotope into dissociation products of opposite charge but not the nonexcited molecules of the second isotope;
   a magnetic field for confining the charged dissociation products in the mixture;
   an electric field means for selectively moving the dissociation products of opposite charge in the mixture in opposite directions;
   one grid means having a first region characterized by a first potential difference for accelerating the dissociation products of positive charge in the mixture through said first region;

a second grid means having a second region characterized by a second potential difference for accelerating the dissociation products of negative charge in the mixture through said second region;

a first collection means for collecting the dissociation products of a positive charge comprising a first duct; and a second collection means for collecting the dissociation products of negative charge comprising a second duct.

2. Apparatus for separating and extracting isotopes of a gaseous mixture containing a first isotope species having a first excitation energy level and a second isotope species having an excitation level different from the first excitation level comprising:

a laser for subjecting the gaseous isotope mixture to a beam tubed to match the energy levels of the first isotope and which has sufficient power density to directly dissociate this molecular isotope by sequential absorbtion of $n$ photons into changed dissociation products but not the second molecular isotope;

a magnetic field for confining the charged dissociation products in the mixture;

an electric field means for selectively moving dissociation products of opposite charge in the mixture in opposite directions;

one grid means having a first region characterized by a first potential difference for accelerating the dissociation products of positive charge in the mixture through said first region;

another grid means having a second region characterized by a second potential difference for accelerating the dissociation products of negative charge in the mixture through said second region;

a first collection means for collecting the dissociation products of positive charge; and, a second collection means for collecting the dissociation products of negative charge.

3. Apparatus as claimed in claim 2, wherein the beam of the laser has a high power density of greater than $10^8$ watts/cm$^2$.

4. Apparatus as claimed in claim 2 including means for neutralizing said dissociation products of positive change in first collection means.

* * * * *